United States Patent [19]
Fang

[11] Patent Number: 5,690,969
[45] Date of Patent: Nov. 25, 1997

[54] CENTER POSITION DEVICE FOR A MOLD

[76] Inventor: Chin-Lung Fang, 9F3R,No.210,Chung Hsueh Rd., Tainan, Taiwan

[21] Appl. No.: 632,264

[22] Filed: Apr. 15, 1996

[51] Int. Cl.⁶ ................................................. B29C 45/17
[52] U.S. Cl. .................... 425/3; 264/39; 425/186; 425/190; 425/192 R; 425/DIG. 33
[58] Field of Search ....................... 425/138, 186, 425/190, 192 R, 575, 576, 453, 454, 3, DIG. 33; 264/39, 328.8, 328.9, 328.11

[56] References Cited

U.S. PATENT DOCUMENTS

| | | | |
|---|---|---|---|
| 4,307,057 | 12/1981 | Hettinga | 264/328.11 |
| 4,473,346 | 9/1984 | Hehl | 425/186 |
| 4,805,285 | 2/1989 | Reyes | 425/186 |
| 4,856,977 | 8/1989 | Von Holdt | 425/192 R |
| 5,333,369 | 8/1994 | Miyairi | 425/190 |

Primary Examiner—Jay H. Woo
Assistant Examiner—Joseph Leyson
Attorney, Agent, or Firm—Pro-Techtor International

[57] ABSTRACT

A center position device for a mold includes an outer housing, and an inner housing. An annular permanent magnet is fitted in the inner housing and covered by a disc secured with washers to close up flat an open lower side of the outer housing. The plural annular magnetic bands are formed in the lower side to be attracted to a mold. The outer housing has a center tubular wall for engaging a sleeve tubular bolt, and a headless tubular bolt engaging in a female threaded hole of the sleeve bolt. A correct pin is fitted in a lower center hole of the headless bolt. A wrench screws the headless bolt to move the correct pin to protrude in an injecting hole of the mold so that after the device is fitted in a threaded rod hole of an injecting machine, the injecting injecting hole of the mold is correctly aligned to the injecting hole of a threaded rod of the machine.

5 Claims, 9 Drawing Sheets

CENTER POSITION DEVICE FOR A MOLD

BACKGROUND OF THE INVENTION

This invention concerns a center position device for a mold used in an injecting shooting machine, particularly possible to let a center injecting hole of a mold quickly and correctly aligned to an injecting hole of a threaded rod of an injecting shooting machine.

In changing a mold for an injecting shooting machine a greatest trouble is to correct the mold, in other words, to let an injecting hole of the mold aligned to an injecting hole of a threaded rod of the machine. Technicians generally use their experience to correct the mold by viewing and repeatedly moving the mold. But the mold is ordinarily heavy, necessary to be hung and moved by a crane in a factory, resulting in time consuming.

Figure 1:
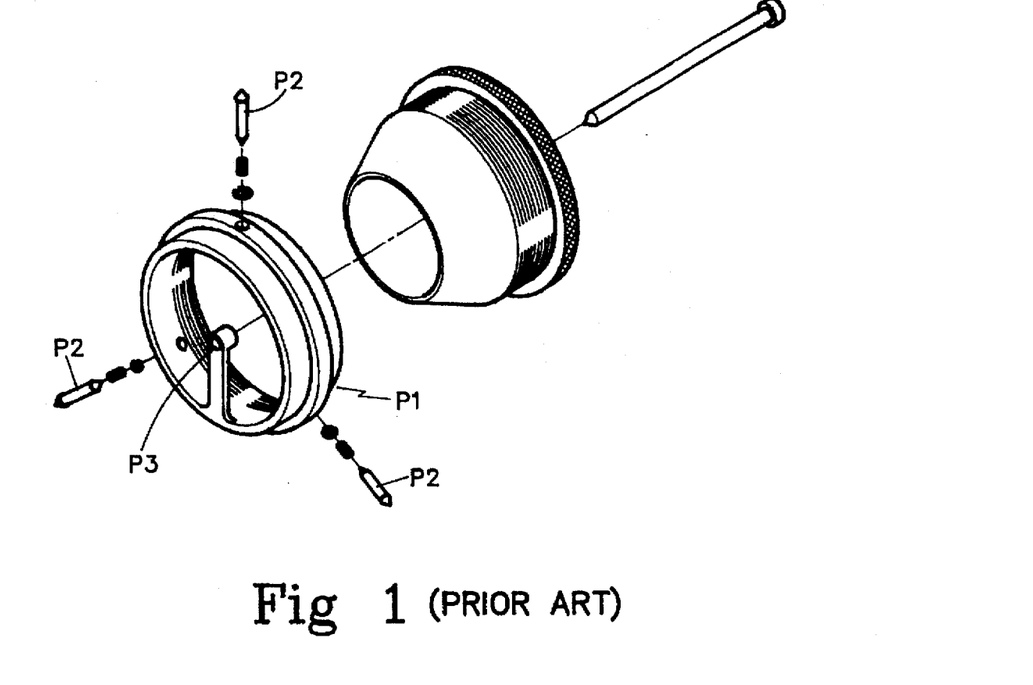
FIG. 1 is an exploded perspective view of a first known conventional center position device for a mold.
Figure 2:
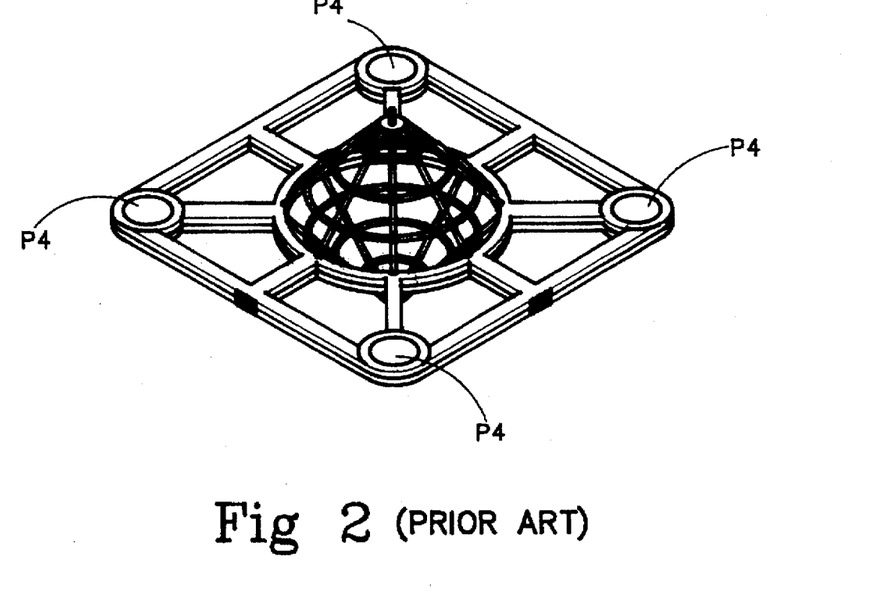
FIG. 2 is a perspective view of a second known conventional center position device for a mold.
Figure 3:
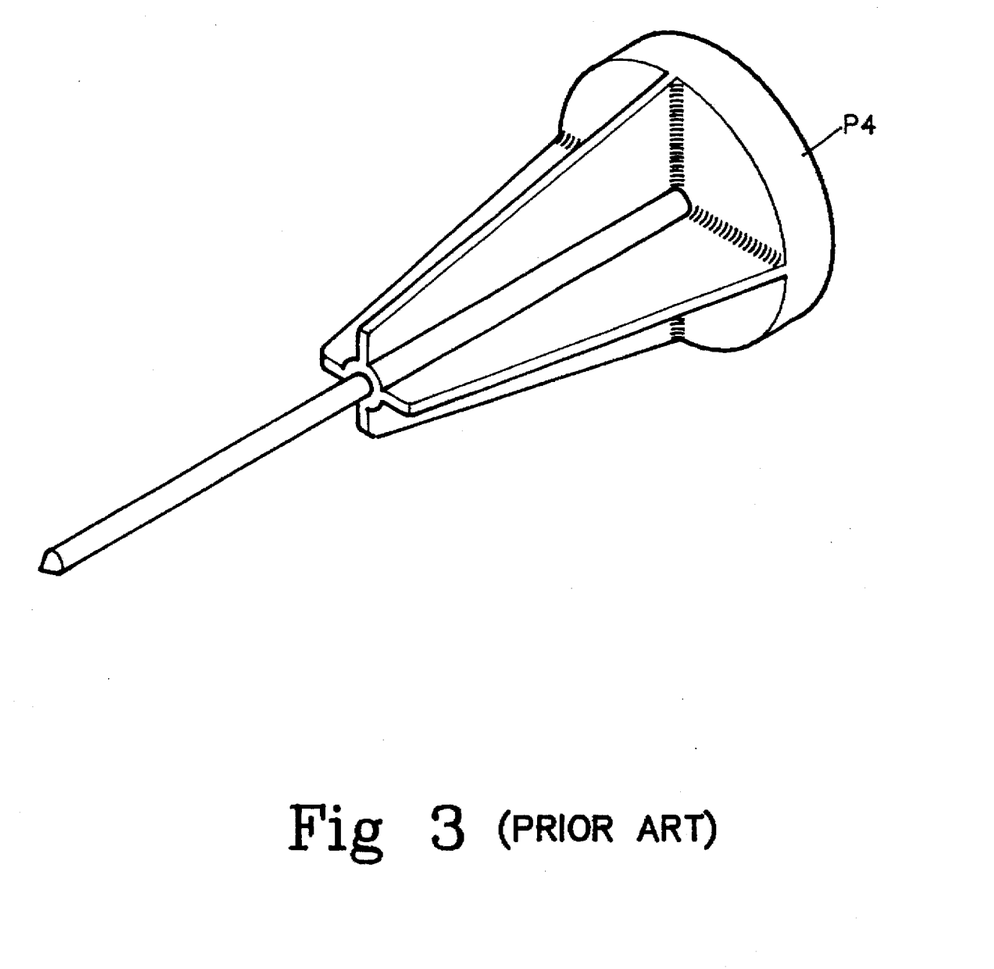
FIG. 3 is a a perspective view of a third known conventional center position device for a mold.

A known conventional center position device shown in FIGS. 1-3 has an annular frame P1 to fit around with an outer surface of a mold, and then screwed with a tightening base. Three rods P2 are utilized to be extended radially inward through the wall of the annular frame P1 to reach a center point hole P3 for correcting the center of the mold.

A second known conventional center position device shown in FIGS. 2 and 3 has four magnetic blocks P4 for sticking on an outer surface of a mold, but it is not revealed how to combine it with a threaded rod hole, so it is difficult to know how to correct the center of the mold.

SUMMARY OF THE INVENTION

The purpose of the invention is to offer a center position device for a mold able to correct promptly and exactly the center of a mold used for an injection shooting machine.

One feature of the invention is a non-magnetic outer housing, and a permanent magnet fitted in a magnetic inner housing fitted in the outer housing, thereby forming plural annular magnetic bands in a lower side of the outer housing so as to enable the center position device attracted on an outer surface of a mold.

Another feature of the invention is the outer housing having a center annular wall and a plurality of view holes. The center annular wall has a center threaded hole for engaging a sleeve tubular bolt, which has an inner female threaded hole for engaging with a headless tubular bolt. The headless tubular bolt has a lower center hole for a correct pin to fit therein.

Another feature of the invention is to utilize the correct pin to be aligned to an injecting hole of a mold, and then to screw the headless tubular bolt with a wrench so as to let the correct pin move and protrude a little in the injecting hole for correcting the position the correct pin against the injecting hole so that the center position device may be attracted on the outer surface of the mold and fitted in the mold wall of an injecting machine, and the injecting hole in the center of the mold may be aligned to the injecting hole of a threaded rod.

One more feature of the invention is the headless tubular bolt that can be screwed in a counterclockwise direction to take the center position device off a mold. And/Or a take-off unit is additionally provided to take the center position device off the mold.

BRIEF DESCRIPTION OF DRAWINGS

This invention will be better understood by reference to the accompanying drawings, wherein.

DESCRIPTION OF THE PREFERRED EMBODIMENTS

A first preferred embodiment of a center position device for a mold in the present invention as shown in FIGS. 4-8, includes an outer housing 1 made of a non-magnetic material. The outer housing 1 has an inverted U-shaped cross-section, a closed upper side, a open lower side, an inner annular cavity 17, a plurality of view holes 2 spaced apart around a center through threaded hole so that an injecting hole M1 of a mold M may be seen so as to let a correct pin 10 be correctly and promptly inserted in the injecting hole M1 before the center position device is attracted on the surface of the mold M. Further, the outer housing 1 has a plurality of dovetail grooves 3 spaced apart equidistantly in a lower portion of a vertical peripheral surface, and the dovetail grooves 3 engage with engage blocks 4, which protrude a little out of the vertical outer surface. When the engage blocks 4 of different thickness are used, the diameter of the outer housing 1 can be altered so as to correspond to the inner diameter of the threaded rod hole M3 of a mold wall M2 of an injecting molding machine. Then the outer housing 1 can tightly fit in the threaded rod hole M3. In order to enable the outer housing 1 promptly fit with the threaded rod hole M3, the engage blocks 4 respectively have a sloped surface 5.

Figure 4:
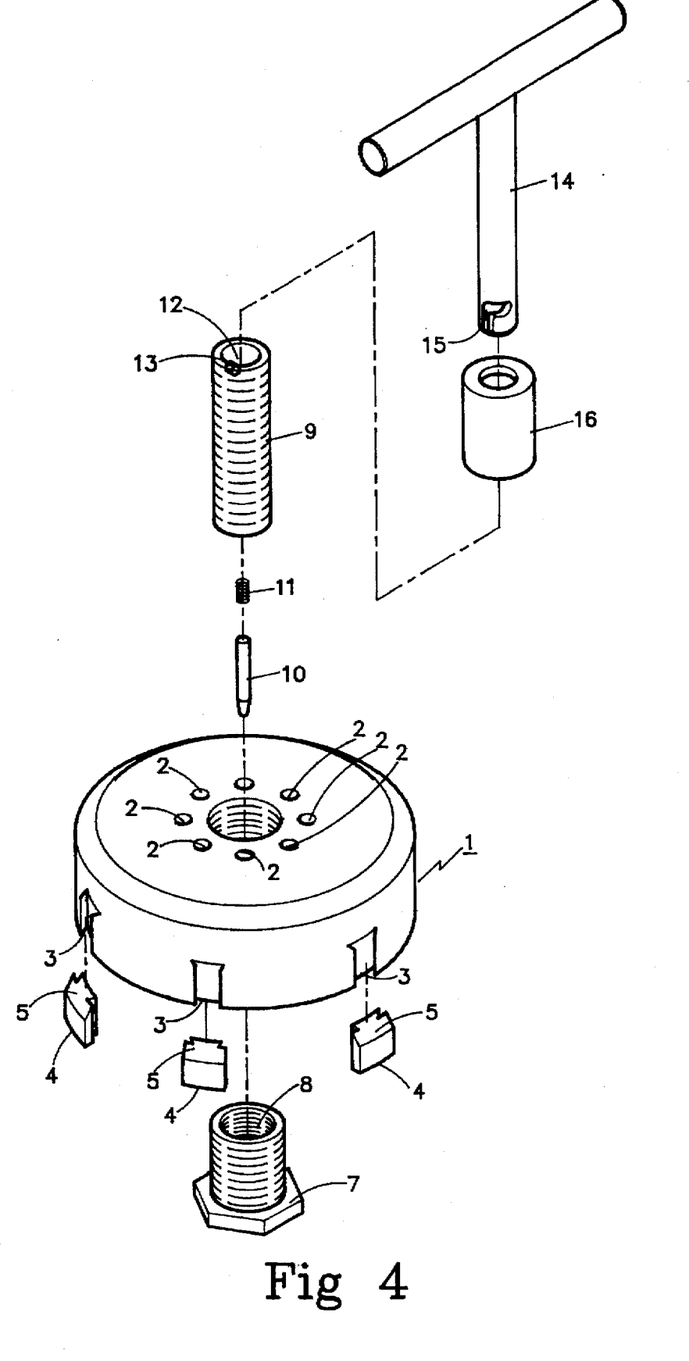
FIG. 4 is an exploded perspective view of a first embodiment of a center position device for a mold in the present invention.
Figure 5:
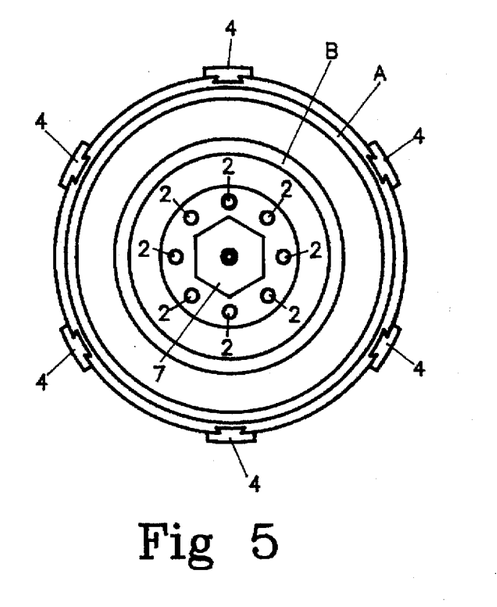
FIG. 5 is a bottom view of the first embodiment of a center position device for a mold in the present invention.
Figure 6:
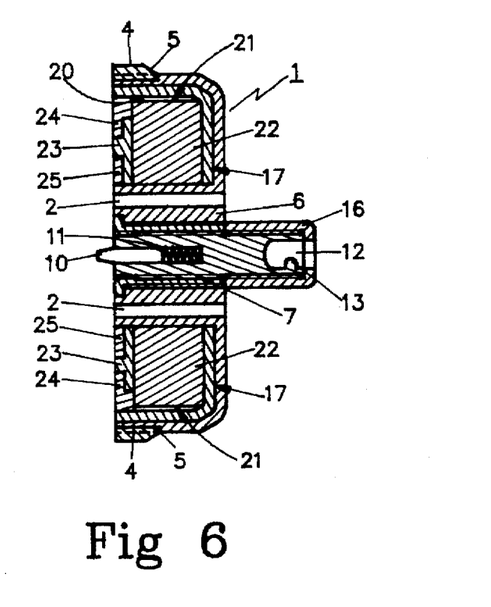
FIG. 6 is a cross-sectional view of line 3—3 in FIG. 5.
Figure 7:
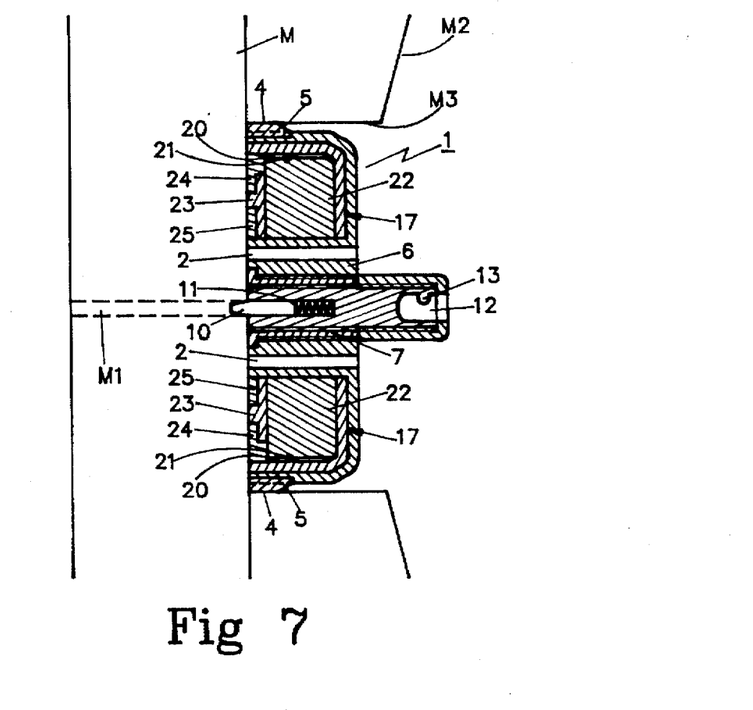
FIG. 7 is a cross-sectional view of the first embodiment of a center position device for a mold fitted in a threaded rod hole of a mold.

Further, the outer housing 1 has a central tubular wall 6 defining the center through threaded hole and extending down from a closed upper side, and a sleeve tubular bolt 7 engaging the center through threaded hole of the central tubular wall 6 and having an inner threaded hole 8 for a headless tubular bolt 9 to engage with. A correct pin 10 is provided to fit in a center hole of a lower end portion of the headless tubular bolt 9, and a spring 11 is placed on the correct pin 10 elastically urging the correct pin 10 in the center hole. The headless tubular bolt 9 has s wrench groove 12 in an upper end of an inner hole surface, and a pin 13 is provided in the wrench groove 12 so that the wrench 14 with a notch 15 can engage the pin 13 so as to screw down and up the headless tubular bolt 9.

In order to protect the male thread of the headless tubular bolt 9, a protective sleeve 16 is provided to be fitted around the upper projecting portion of the headless bolt 9 out of the upper surface of the outer housing 1 before the center position device is placed on the mold M fixed on an injecting molding machine.

Figure 8:
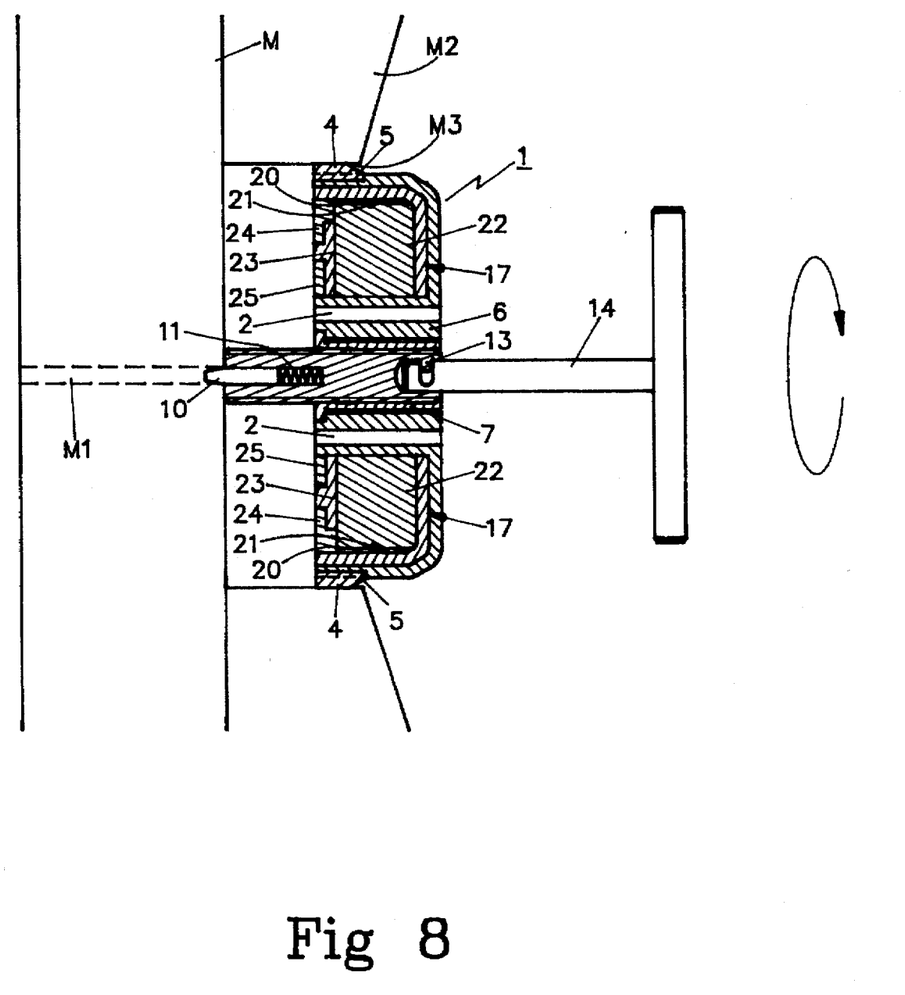
FIG. 8 is a cross-sectional view of the first embodiment of a center position device for a mold being separated from the mold.
Figure 9:
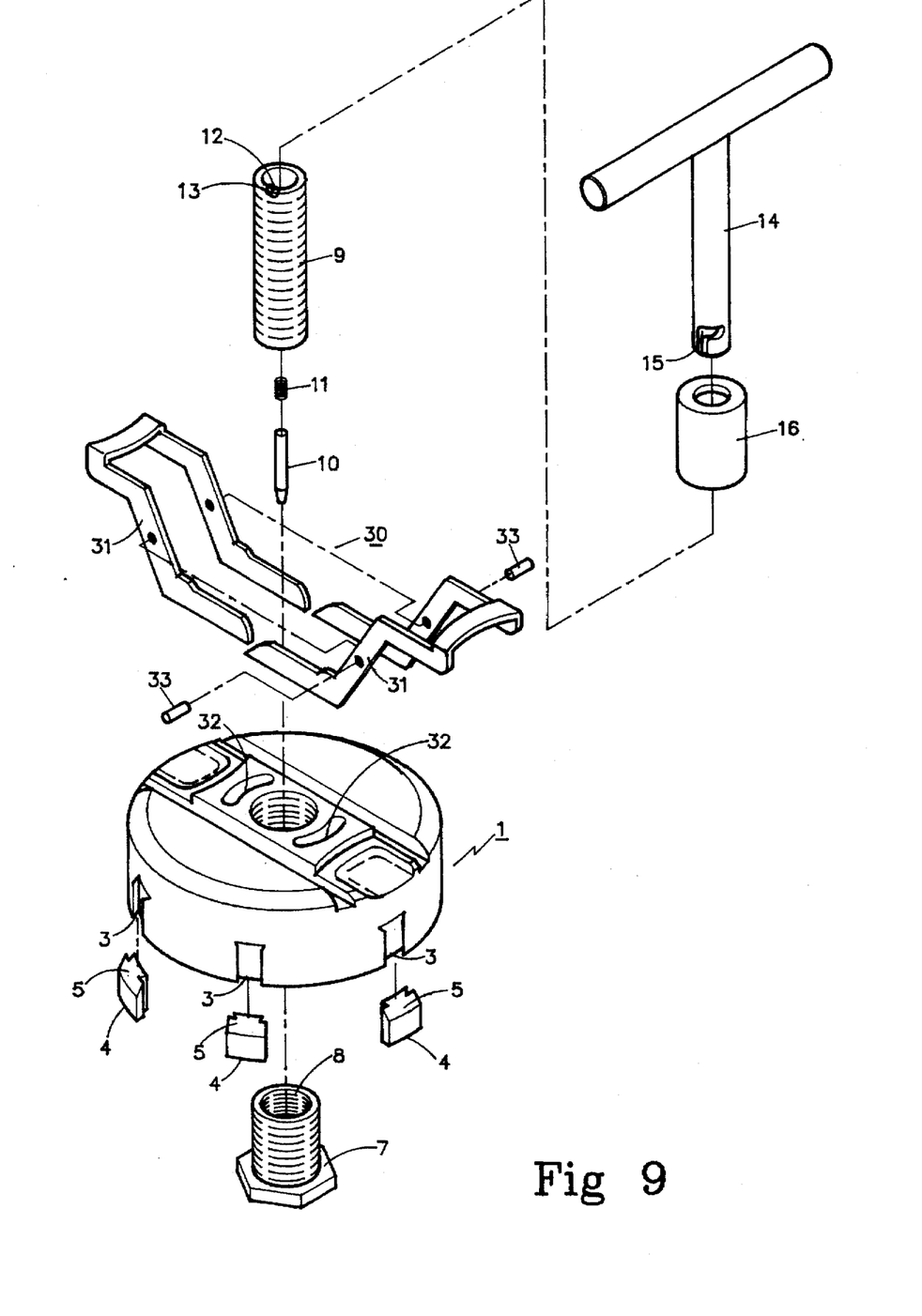
FIG. 9 is an exploded perspective view of a second embodiment of a center position device for a mold in the present invention.
Figure 10:
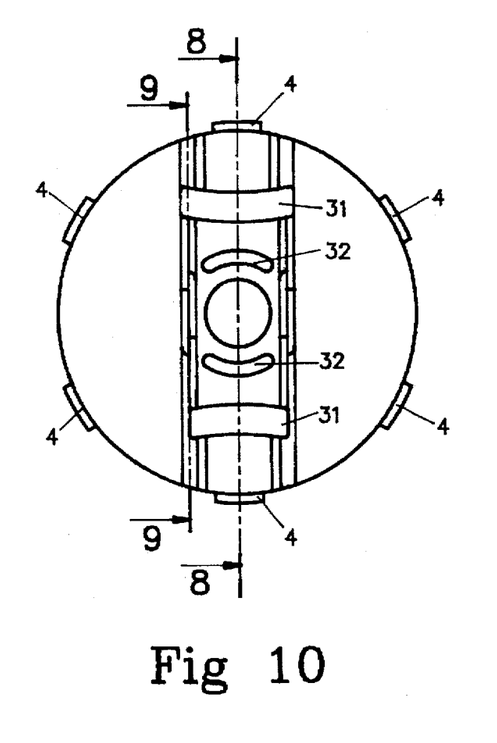
FIG. 10 is an upper view of the second embodiment of a center position device for a mold in the present invention.
Figure 11:
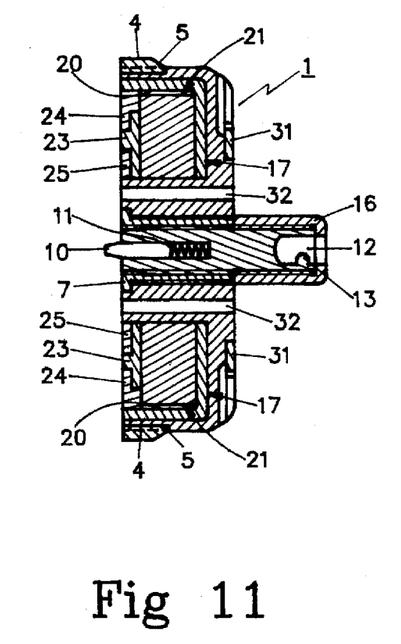
FIG. 11 is a cross-sectional view of line 8—8 in FIG. 10.
Figure 12:
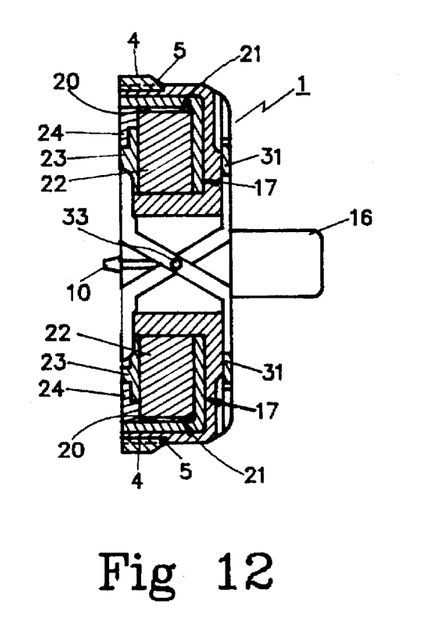
FIG. 12 is a cross-sectional view of line 9—9 in FIG. 10.
Figure 13:
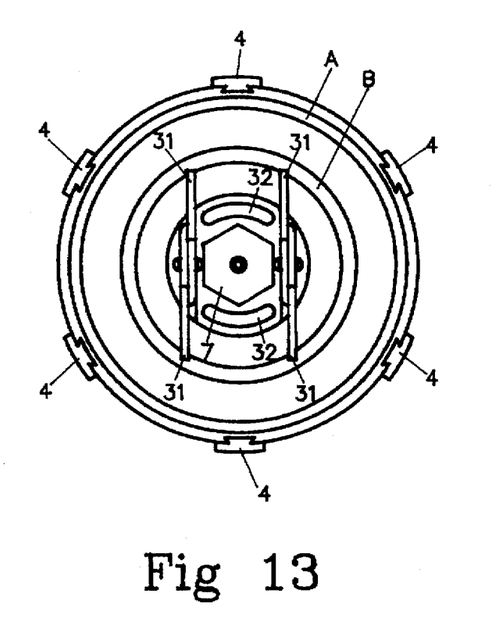
FIG. 13 is a bottom view of the second embodiment of a center position device for a mold in the present invention.
Figure 14:
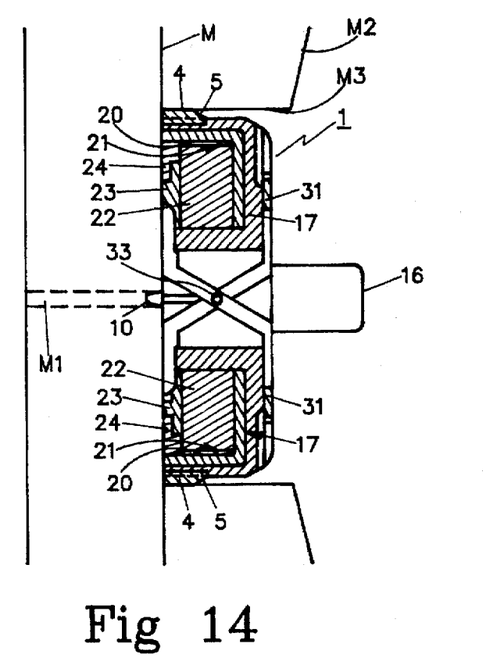
FIG. 14 is a cross-sectional view of the second embodiment of a center position device for a mold fitted in a threaded rod hole of a mold.

The inner housing 20 has an inner annular cavity 21 opening downward for an annular permanent magnet 22 to fit therein, attracted to the inner housing 20. Further, an annular disc 23 with an annular projection 23 is provided to be placed under the permanent magnet 22 and secured stably by two washers 24, 25 made of a non-magnetic material. Thus the open lower side of the outer housing 1 is kept flat and smooth, and two magnetic annular bands A and B are formed by means of the annular permanent magnet 22 therein so that the center position device may easily be attracted to stay on the outer surface of a mold. After the center of the mold is corrected, the center position device may be taken off by screwing the headless tubular bolt 9, as shown in FIG. 8.

Figure 15:
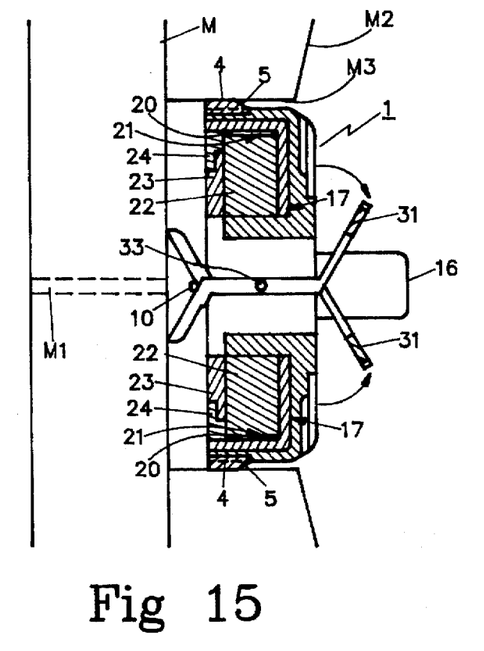
FIG. 15 is a cross-sectional view of the second embodiment of a center position device for a mold being separated from the mold; and, FIG. 16 is a cross-sectional view of a third embodiment of a center position device for a mold in the present invention.

A second preferred embodiment of the invention is shown in FIGS. 9–15, has the same structure as the first preferred embodiment except a take-off unit 30 additionally provided. The take-off unit 30 has a pair of two parallel rods 31, 31, of a symmetrical shape to be inserted in two curved rod holes 32, 32 provided in the outer housing 1 and then positioned by two pins B3 to let the two parallel rods 31, 31 to rotate with the pins 33, 33 as a center. After the center of a mold is corrected, the second embodiment of the center position device may be taken off the mold, by pulling off with force the pair of two parallel rods 31, 31, as shown in FIG. 15.

Figure 16:
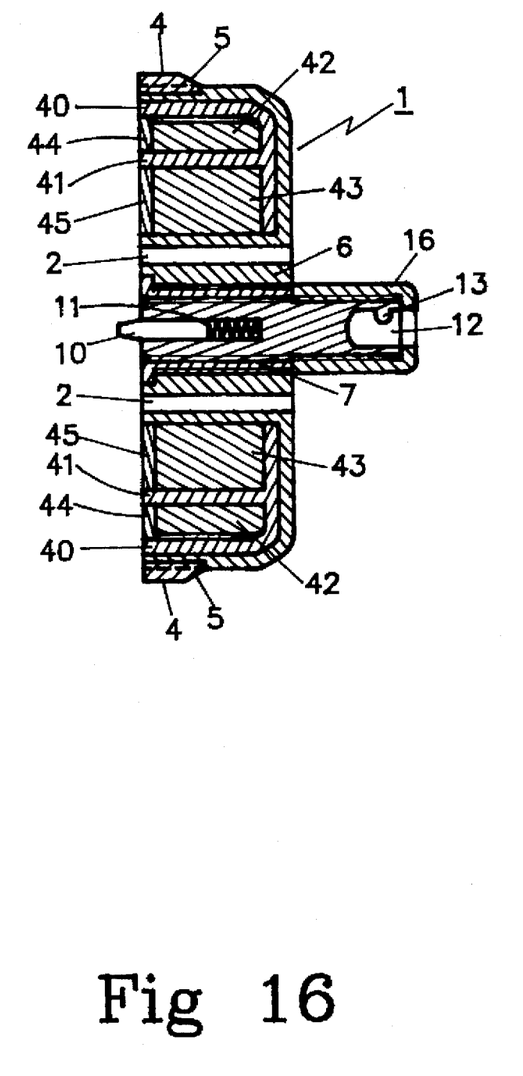

FIG. 16 shows a third preferred embodiment of the invention, which has the same structure as the first and the second embodiment, except two or more inner housings 40, 41 instead of the single inner housing 1 in the first and the second embodiment and two permanent magnets 42, 43, and two washers 44, 45 securing the two magnets 42, 43 in their places. The third preferred embodiment has the same function as the first and the second embodiment.

While the preferred embodiments of the invention have been described above, it will be recognized and understood that various modifications may be made therein and the appended claims are intended to cover all such modifications which may fall within the spirit and scope of the invention.

What is claimed is:

1. A center position device for a mold comprising:

a sleeve tubular bolt; a plurality of engagement blocks; a headless tubular bolt; an annular permanent magnet; a correct pin; an outer housing of a U-shaped cross-section having an open lower side, a closed upper side, a plurality of view holes spaced equidistantly around a center through threaded hole, a center tubular wall defining said center through hole and extending down from the center of the closed upper side, said center through threaded hole being for said sleeve tubular bolt to engage therein, and a vertical peripheral surface provided with a plurality of dovetail-shaped grooves spaced apart equidistantly for said plurality of engagement blocks to engage therewith, said sleeve tubular bolt having an inner female thread for said headless tubular bolt to engage therewith;

an inner housing of a U-shaped cross-section fitted in said outer housing and having an open lower side, a closed upper side with a center hole for said center tubular wall of said outer housing to pass through and an inner annular cavity for said annular permanent magnet to fit therein;

a disc with an annular projecting down wall fixed under said permanent magnet and secured in place by two washers so as to form a flat surface at said lower side of said outer housing; and two annular magnetic bands formed by means of said permanent magnet to enable said center position device to be attracted to an outer surface of said mold, with said correct pin being fitted in said headless bolt and being fitted in an injecting hole of said mold, whereby when said mold is hung up and moved to a mold wall of an injecting molding machine said center position device is fitted in a threaded rod hole of said mold wall, and said threaded rod hole being thus aligned to the injecting hole of said mold.

2. The center position device for a mold as claimed in claim 1, wherein said engagement blocks fitted in said dovetail-shaped grooves of said outer housing have different thickness and are changeable to those having a proper thickness so as to correspond to the inner diameter of said threaded rod hole of said mold wall of said injecting machine.

3. The center position device for a mold as claimed in claim 1, wherein said engagement blocks each have a sloped surface to fit tightly with said thread rod hole of said mold wall of said injecting molding machine.

4. A center position device for a mold comprising:

a plurality Of engagement blocks; a headless tubular bolt; an annular permanent magnet; an outer housing having an inverted U-shaped cross-section, an open lower side, a closed upper side, a plurality of view holes space apart equidistantly around a center through threaded hole, a center tubular wall defining said center through threaded hole opening to said closed upper side and extending down from the center of said closed upper side, said center through threaded hole engaging with a sleeve tubular bolt, a vertical peripheral surface provided with a plurality of dovetail-shaped grooves spaced apart equidistantly for said plurality of engagement blocks to engage therewith, said sleeve tubular bolt having an inner female thread for said headless tubular bolt to engage therein;

an inner housing of an inverted U-shaped cross-section fitted in said outer housing, having an open lower side, a closed upper side with a center hole for said center tubular wall of said outer housing to pass through, and an inner annular cavity for said annular permanent magnet to fit therein;

a disc with an annular projecting-down wall made of a magnetic material and fixed under said permanent magnet, and secured in place with two washers to close and form a flat surface at the open lower side of said outer housing;

said permanent magnet forming two annular magnetic bands in said lower side of said outer housing to permit said center position device to be attracted to an outer surface of a mold, a correct pin being fitted in a lower portion of said headless tubular bolt and being movable to protrude in an injecting hole of said mold, whereby said headless tubular bolt is screwable by a wrench to position said correct pin, and whereby when said mold is hung up and moved to a mold wall of an injecting molding machine, said center position device is fitted in a threaded rod hole of said mold wall so that said threaded rod hole is correctly aligned to said injecting hole of said mold; and said correct pin being elastically urged by a spring placed on said correct pin so as to protrude in said injecting hole of said mold, and said headless tubular bolt having a wrench groove with a pin on an upper end section for a notch of said wrench to engage therewith so that said wrench may screw said headless tubular bolt to let said correct pin move to protrude in and retreat out of said injecting hole of said mold.

5. The center position device as claimed in claim 4, further comprising a take-out unit having a pair of parallel rods, wherein said outer housing further has two curved holes around said center through threaded hole for said pair of parallel rods of said take-out unit to extend therein so as to take said center position device off said mold.

* * * * *